US009336586B2

(12) United States Patent
Nagoshi

(10) Patent No.: US 9,336,586 B2
(45) Date of Patent: May 10, 2016

(54) IMAGE PROCESSING APPARATUS AND IMAGE PROCESSING METHOD USING COMPRESSED IMAGE DATA OR PARTIAL IMAGE DATA

(71) Applicant: Keyence Corporation, Osaka (JP)

(72) Inventor: Keisuke Nagoshi, Osaka (JP)

(73) Assignee: Keyence Corporation, Osaka (JP)

( * ) Notice: Subject to any disclaimer, the term of this patent is extended or adjusted under 35 U.S.C. 154(b) by 380 days.

(21) Appl. No.: 13/653,490

(22) Filed: Oct. 17, 2012

(65) Prior Publication Data

US 2013/0129183 A1 May 23, 2013

(30) Foreign Application Priority Data

Nov. 18, 2011 (JP) ................................. 2011-252905

(51) Int. Cl.
G06K 9/00 (2006.01)
G06T 7/00 (2006.01)
(52) U.S. Cl.
CPC .................................... G06T 7/0004 (2013.01)
(58) Field of Classification Search
None
See application file for complete search history.

(56) References Cited

U.S. PATENT DOCUMENTS

| 7,522,664 B1 * | 4/2009 | Bhaskar et al. ........... 375/240.01 |
| 2007/0286495 A1 * | 12/2007 | Pine et al. .................... 382/209 |
| 2011/0029606 A1 * | 2/2011 | Ozawa ........................... 709/203 |
| 2011/0194752 A1 * | 8/2011 | Pang ............................ 382/149 |
| 2013/0140457 A1 * | 6/2013 | Minekawa et al. ........... 250/307 |

FOREIGN PATENT DOCUMENTS

| JP | 06-022149 | 1/1994 |
| JP | 2006-300775 | 11/2006 |
| JP | 2007-278928 | 10/2007 |
| JP | 2009-063365 | 3/2009 |
| JP | 2009-273005 | 11/2009 |
| WO | WO 2011074183 A1 * | 6/2011 ........... G01N 23/225 |

* cited by examiner

Primary Examiner — Andrew Moyer
(74) Attorney, Agent, or Firm — Kilyk & Bowersox, P.L.L.C.

(57) ABSTRACT

Provided is an image processing apparatus capable of viewing even a characteristic portion of an inspection object even if partial image data of the inspection object is used for inspection. The image processing apparatus includes: an imaging portion for imaging an inspection object; a compression processing portion for executing compression processing on image data captured by the imaging portion, to generate compressed image data; and an image processing portion for executing image processing for an inspection. The image processing portion generates partial image data as part of the captured image data, and accepts a selection of any of the compressed image data and the partial image data as the image data for use in the image processing. The image processing portion executes the image processing for the inspection by use of the compressed image data or the partial image data, the selection of which has been accepted.

19 Claims, 13 Drawing Sheets

FIG. 14

| PROGRAM 01 | | SETTING EXAMPLE |
|---|---|---|
| EXTERNAL OUTPUT 1-4 | ALLOCATION OF OUTPUT FUNCTION | DETECT/BUSY/ERROR_ALL/POSITION |
| TRIGGER RELATED | TRIGGER SYSTEM | INSIDE(PERIOD[50ms]) / OUTSIDE(DELAY[50ms]) |
| TRIGGER RELATED | INTERNAL TRIGGER PERIOD | 50ms |
| TRIGGER RELATED | IMAGING DELAY TIME | 10ms |
| IMAGING RELATED | BRIGHTNESS | 50 |
| IMAGING RELATED | MODE | NORMAL / HDR / Hi-Gain |
| IMAGING RELATED | INTERNAL ILLUMINATION | ON/OFF |
| IMAGING RELATED | AF ADJUSTMENT POSITION | 40 |
| IMAGING RELATED | ZOOM SETTING | NORMAL/2-FOLD ZOOM |
| IMAGING RELATED | MAXIMIZATION OF IMAGE TAKING RANGE | ON/OFF |
| IMAGING RELATED | IMAGE TAKING RANGE (CENTER COORDINATE, WIDTH, HEIGHT) | "(159.5, 119.5), (320.0, 240.0)" |
| IMAGING RELATED | IMAGE TAKING RANGE | ENTIRE RANGE/CUSTOM RANGE (CENTER COORDINATE [159.5:119.5], WIDTH[320.0], HEIGHT[240.0]) |
| COLOR FILTER | | RGB(OFF) |
| ILLUMINATION CORRECTION | VALID/INVALID | INVALID |
| ILLUMINATION CORRECTION | CORRECTED RANGE (CENTER COORDINATE, WIDTH, HEIGHT) | "(159.5, 119.5), (320.0, 240.0)" |
| ILLUMINATION CORRECTION | CORRECTION/NON-CORRECTION | VALID (CENTER COORDINATE[159.5 119.5], WIDTH[320.0], HEIGHT[240.0])/INVALID |
| MASTER IMAGE | MASTER IMAGE | |
| TOOL 00 | TOOL TYPE | CORRECT POSITION |
| TOOL 00 | TEMPLATE SHAPE | RECTANGLE |
| TOOL 00 | TEMPLATE POSITION (CENTER COORDINATE) | (159.5, 119.5) |
| TOOL 00 | TEMPLATE RANGE | (100.0, 100.0) |
| TOOL 00 | TEMPLATE RANGE | RECTANGLE (CENTER COORDINATE[159.5:119.5], WIDTH[100.0], HEIGHT[100.0]) |
| TOOL 00 | TEMPLATE ANGLE | 0 |
| TOOL 00 | MAXIMIZATION OF DETECTED RANGE | ON |
| TOOL 00 | DETECTED RANGE SHAPE | RECTANGLE |
| TOOL 00 | DETECTED RANGE POSITION (CENTER COORDINATE) | (159.5, 119.5) |
| TOOL 00 | DETECTED RANGE | (320.0, 240.0) |
| TOOL 00 | DETECTED RANGE | ENTIRE RANGE/RECTANGLE (CENTER COORDINATE [159.5:119.5], WIDTH[320.0], HEIGHT[240.0]) |
| TOOL 00 | THRESHOLD: DEGREE OF AGREEMENT | 70 |
| TOOL 00 | ROTATION ACCEPTABLE RANGE (LOWER LIMIT, UPPER LIMIT) | [-180, 180] |
| TOOL 01 | TOOL TYPE | EDGE TOOL |
| TOOL 01 | TOOL NAME | SCREW EDGE |
| TOOL 01 | SEARCHING ACCURACY | ROBUST |
| TOOL 01 | TEMPLATE SHAPE | RECTANGLE |
| TOOL 01 | TEMPLATE POSITION (CENTER COORDINATE) | (159.5, 119.5) |
| TOOL 01 | TEMPLATE RANGE | (100.0, 100.0) |
| TOOL 01 | TEMPLATE RANGE | RECTANGLE (CENTER COORDINATE[159.5:119.5], WIDTH[100.0], HEIGHT[100.0]) |
| TOOL 01 | TEMPLATE ANGLE | 0 |
| TOOL 01 | MAXIMIZATION OF DETECTED RANGE | ON |
| TOOL 01 | DETECTED RANGE SHAPE | RECTANGLE |
| TOOL 01 | DETECTED RANGE POSITION (CENTER COORDINATE) | (159.5, 119.5) |
| TOOL 01 | DETECTED RANGE | (320.0, 240.0) |
| TOOL 01 | DETECTED RANGE | ENTIRE RANGE/RECTANGLE (CENTER COORDINATE [159.5:119.5], WIDTH[320.0], HEIGHT[240.0]) |
| TOOL 01 | THRESHOLD: DEGREE OF AGREEMENT | 70 |
| TOOL 01 | ROTATION ACCEPTABLE RANGE (LOWER LIMIT, UPPER LIMIT) | [-180, 180] |

IMAGE PROCESSING APPARATUS AND IMAGE PROCESSING METHOD USING COMPRESSED IMAGE DATA OR PARTIAL IMAGE DATA

CROSS-REFERENCE TO RELATED APPLICATIONS

The present application claims foreign priority based on Japanese Patent Application No. 2011-252905, filed Nov. 18, 2011, the contents of which is incorporated herein by reference.

BACKGROUND OF THE INVENTION

1. Field of the Invention

The present invention relates to an image processing apparatus which can set a detailed inspection condition by use of a clearer expanded image in the case of setting the inspection condition for inspecting an inspection object, and an image processing method and a computer program which are executed in the image processing apparatus.

2. Description of Related Art

In the case of executing visual inspection of an inspection object, image processing is executed on image data captured by an imaging device performing imaging, to determine failure/non-failure of the inspection object with higher accuracy. In the case of executing image processing on image data, captured by performing imaging, as it is, an arithmetic processing load becomes excessively large due to a large amount of data, and accordingly, and there has thus been developed a technique for executing image processing on compressed image data obtained by compressing image data captured by performing imaging.

For example, Japanese Unexamined Patent Publication No. 2009-063365 discloses an inspection device which performs data compression on each image data captured by imaging an inspection object to reduce an amount of data, thereby allowing alleviation of the arithmetic processing load in the case of executing image processing. Since the arithmetic processing load in the case of executing the image processing can be alleviated, arithmetic processing time can be reduced, and inspection cycle time can also be reduced.

However, in the case of executing an inspection by use of compressed image data, a characteristic portion viewable in original image data before compression may possibly be collapsed depending on a compression rate. There has thus been a problem in that it may become difficult to view the characteristic portion of the inspection object and a defect of the inspection object might not be able to be correctly detected.

Further, the inspection may be executed by use of partial image data obtained by cutting out part of the image data.

However, in the case of executing a periphery inspection for inspecting an edge of the inspection object, or the like, the inspection may not be correctly executed only by the partial image data. That is, in the case where only the partial image data is always used, there has been a problem in that the periphery inspection may not be executed on image data other than the partial image data to be used.

SUMMARY OF THE INVENTION

The present invention has been made in view of such circumstances, and an object thereof is to provide an image processing apparatus, which is capable of viewing even a characteristic portion of an inspection object even in the case of using partial image data of the inspection object for an inspection, and an image processing method and a computer program which are executed in the image processing apparatus.

In order to achieve the above object, according to one embodiment of the invention, an image processing apparatus includes: an imaging portion (an imaging unit) for imaging an inspection object; a compression processing portion (a compression processing unit) for executing compression processing on image data captured by performing imaging in the imaging portion, to generate compressed image data; and an image processing portion (an image processing unit) for executing image processing for an inspection; a partial image generating portion (a partial image generating unit) for generating partial image data as part of the captured image data; and a selection accepting portion (a selection accepting unit) for accepting a selection of any of the compressed image data and the partial image data, wherein the image processing portion executes the image processing for the inspection by use of the compressed image data or the partial image data, the selection of which has been accepted in the selection accepting portion.

Further, according to another embodiment of the invention, the image processing apparatus according to the first aspect includes an inspection condition data setting portion for setting inspection condition data concerning a condition for inspecting the inspection object, the inspection condition data including a parameter showing which of the compressed image data and the partial image data is to be used, as the image data for use in the image processing, wherein the selection accepting portion accepts the selection of the image data for use in the image processing based on the parameter included in the inspection condition data.

Further, according to still another embodiment of the invention, the image processing apparatus according to the first or second aspect includes an inspection condition switching instruction accepting portion for accepting a switching instruction for the inspection condition data, wherein, when the inspection condition switching instruction accepting portion accepts the switching instruction for the inspection condition data, the selection accepting portion accepts the selection of the image data for use in the image processing based on the parameter included in the inspection condition data after switching.

Further, according to still another embodiment of the invention, the image processing apparatus according to any one of the first to third aspects includes a reference image storing portion for storing, as a reference image, the compressed image data or the partial image data, the selection of which has been accepted in the selection accepting portion, wherein the image processing portion makes a comparison with the stored reference image, to execute the image processing for the inspection.

Further, according to still another embodiment of the invention, in the image processing apparatus according to any one of the first to fourth aspects, the partial image generating portion generates the partial image data including a center of the captured (acquired) image data.

Further, according to still another embodiment of the invention, in the image processing apparatus according to any one of the first to fourth aspects, the partial image generating portion includes an extracted range setting portion for setting a range to be extracted as the partial image data.

Further, according to still another embodiment of the invention, in the image processing apparatus according to any one of the first to sixth aspects, the partial image generating portion generates the partial image data so that an aspect ratio of the partial image data is equal to an aspect ratio of a screen on which an image is displayed.

Further, according to still another embodiment of the invention, in the image processing apparatus according to any one of the first to seventh aspects, the partial image generating portion generates the partial image data so that the number of pixels of the partial image data is equal to the number of pixels of the screen on which the image is displayed Next, in order to achieve the above object, according to still another embodiment of the invention, there is provided an image processing method executable by an image processing apparatus, the apparatus including: an imaging portion for imaging an inspection object; a compression processing portion for executing compression processing on image data captured by performing imaging in the imaging portion, to generate compressed image data; and an image processing portion for executing image processing for an inspection, wherein the image processing portion generates partial image data as part of the captured image data, accepts a selection of any of the compressed image data and the partial image data, and executes the image processing for the inspection by use of the compressed image data or the partial image data, the selection of which has been accepted.

Further, according to still another embodiment of the invention, in the image processing method according to the ninth aspect, inspection condition data concerning a condition for inspecting the inspection object is set as the image data for use in the image processing, the inspection condition data including a parameter showing which of the compressed image data and the partial image data is to be used, and the selection of the image data for use in the image processing is accepted based on the parameter included in the inspection condition data.

Further, according to still another embodiment of the invention, in the image processing method according to the ninth or tenth aspect, a switching instruction for the inspection condition data is accepted, and when the switching instruction for the inspection condition data is accepted, the selection of the image data for use in the image processing is accepted based on the parameter included in the inspection condition data after switching.

Further, according to still another embodiment of the invention, in the image processing method according to any one of the ninth to eleventh aspects, the compressed image data or the partial image data, the selection of which has been accepted, is stored as the reference image, and a comparison is made with the stored reference image, to execute the image processing for the inspection.

Further, according to still another embodiment of the invention, in the image processing method according to any one of the ninth to twelfth aspects, the partial image data including a center of the captured image data is generated.

Further, according to still another embodiment of the invention, in the image processing method according to any one of the ninth to twelfth aspects, a range to be extracted as the partial image data is set.

Further, according to still another embodiment of the invention, in the image processing method according to any one of the ninth to fourteenth aspects, the partial image data is generated so that an aspect ratio of the partial image data is equal to an aspect ratio of a screen on which an image is displayed.

Further, according to still another embodiment of the invention, in the image processing method according to any one of the ninth to fifteenth aspects, the partial image data is generated so that the number of pixels of the partial image data is equal to the number of pixels of the screen on which the image is displayed Next, in order to achieve the above object, according to still another embodiment of the invention, there is provided a computer program executable by an image processing apparatus, the apparatus including: an imaging portion for imaging an inspection object; a compression processing portion for executing compression processing on image data captured by performing imaging in the imaging portion, to generate compressed image data; and an image processing portion for executing image processing for an inspection, wherein the image processing portion is caused to function as a partial image generating unit for generating partial image data as part of the captured image data, a selection accepting portion for accepting a selection of any of the compressed image data and the partial image data as the image data for use in the image processing, and a unit for executing the image processing for the inspection by use of the compressed image data or the partial image data, the selection of which has been accepted.

Further, according to still another embodiment of the invention, in the computer program according to the seventeenth aspect, the image processing portion is caused to function as an inspection condition data setting unit for setting inspection condition data concerning a condition for inspecting the inspection object, the inspection condition data including a parameter showing which of the compressed image data and the partial image data is to be used, as the image data for use in the image processing, and the selection accepting portion is caused to function as a unit for accepting the selection of the image data for use in the image processing based on the parameter included in the inspection condition data.

Further, according to still another embodiment of the invention, in the computer program according to the seventeenth or eighteenth aspect, the image processing portion is caused to function as an inspection condition switching instruction accepting portion for accepting a switching instruction for the inspection condition data, and when the inspection condition switching instruction accepting portion accepts the switching instruction for the inspection condition data, the selection accepting portion is caused to function as a unit for accepting the selection of the image data for use in the image processing based on the parameter included in the inspection condition data after switching.

Further, according to still another embodiment of the invention, in the computer program according to any one of the seventeenth to nineteenth aspects, the image processing portion is caused to function as a reference image storing unit for storing, as a reference image, the compressed image data or the partial image data, the selection of which has been accepted in the selection accepting portion, and a unit for making a comparison with the stored reference image, to execute the image processing for the inspection.

Further, according to still another embodiment of the invention, in the computer program according to any one of the seventeenth to twentieth aspects, the partial image generating unit is caused to function as a unit for generating the partial image data including the center of the captured image data.

Further, according to still another embodiment of the invention, in the computer program according to any one of the seventeenth to twentieth aspects, the partial image generating unit is caused to function as an extracted range setting unit for setting a range to be extracted as the partial image data.

Further, according to still another embodiment of the invention, in the computer program according to any one of the seventeenth to twenty-second aspects, the partial image generating unit is caused to function as a unit for generating the partial image data so that an aspect ratio of the partial image data is equal to an aspect ratio of a screen on which an image is displayed Further, according to still another embodiment of the invention, in the computer program according to any one of the seventeenth to twenty-third aspects, the partial image generating unit is caused to function as a unit for generating the partial image data so that the number of pixels of the partial image data is equal to the number of pixels of the screen on which the image is displayed In the first, ninth, and seventeenth aspects, the image processing apparatus includes: an imaging portion for imaging an inspection object; a compression processing portion for executing compression processing on image data captured by performing imaging in the imaging portion, to generate compressed image data; and an image processing portion for executing image processing for an inspection. The image processing portion generates partial image data as part of the captured image data, and accepts a selection of any of the compressed image data and the partial image data as image data for use in the image processing. The image processing portion executes the image processing for the inspection by use of the compressed image data or the partial image data. By appropriately selecting any of the compressed image data and the partial image data, the selection of which has been accepted, in accordance with contents of the inspection, the need for generating unnecessary image data is eliminated. Further, even in the case of executing the image processing by use of the partial image data, accuracy of inspection is not reduced, thus allowing apparent exertion of an effect similar to an effect obtained by increasing a visual field magnification.

In the second, tenth, and eighteenth aspects, inspection condition data concerning a condition for inspecting the inspection object is set as the image data for use in the image processing, the inspection condition data including a parameter showing which of the compressed image data and the partial image data is to be used, and the selection of the image data for use in the image processing is accepted based on the parameter included in the inspection condition data. This allows appropriate selection of the compressed image data or the partial image data by means of the parameter included in the inspection condition data in accordance with the contents of the inspection, thus eliminating the need for generating unnecessary image data. Further, even in the case of executing the image processing by use of the partial image data, the accuracy of inspection is not reduced, thus allowing apparent exertion of an effect similar to an effect obtained by increasing a visual field magnification.

In the third, eleventh, and nineteenth aspects, a switching instruction for the inspection condition data is accepted, and when the switching instruction for the inspection condition data is accepted, the selection of the image data for use in the image processing is accepted based on the parameter included in the inspection condition data after switching. This allows switching of a selection of which of the compressed image data and the partial image data is to be used, by means of the parameter included in the inspection condition data, every time the inspection condition data is switched, thus eliminating the need for generating unnecessary image data. Further, even in the case of executing the image processing by use of the partial image data, the accuracy of inspection is not reduced, thus allowing apparent exertion of an effect similar to an effect obtained by increasing a visual field magnification.

In the fourth, twelfth, and twentieth aspects, the compressed image data or the partial image data, the selection of which has been accepted, is stored and a comparison is made with the stored reference image, to execute the image processing for the inspection, thereby eliminating the need for generating unnecessary image data. Further, even in the case of executing the image processing by use of the partial image data, the accuracy of inspection is not reduced, thus allowing apparent exertion of an effect similar to an effect obtained by increasing a visual field magnification.

In the fifth, thirteenth, and twenty-first aspects, the partial image data including the center of the captured image data is generated, thereby allowing generation of partial image data including a characteristic portion of the inspection object which is often arranged at the center of the image and imaged.

In the sixth, fourteenth, and twenty-second aspects, a range to be extracted as the partial image data is set, thereby allowing reliable generation of the partial image data including the characteristic portion of the inspection object.

In the seventh, fifteenth, and twenty-third aspects, the partial image data is generated so that an aspect ratio of the partial image data is equal to an aspect ratio of a screen on which an image is displayed. Accordingly, enlarged or reduced display with an aspect ratio different from that of original image data is prevented in the case of screen-displaying the partial image data.

In the eighth, sixteenth, and twenty-fourth aspects, the partial image data is generated so that the number of pixels of the partial image data is the same the number of pixels of the screen on which the image is displayed. Accordingly, clearness equal to that of the original image data can be obtained, to allow viewing of the characteristic portion of the inspection object.

In the present invention, any of compressed image data and partial image data is appropriately selected in accordance with contents of an inspection, thereby eliminating the need for generating unnecessary image data. Further, even in the case of executing image processing by use of the partial image data, the accuracy of inspection is not reduced, thus allowing apparent exertion of an effect similar to an effect obtained by increasing a visual field magnification.

BRIEF DESCRIPTION OF THE DRAWINGS

FIG. 14 is a table showing a list of inspection condition data for a positional correction tool and an edge discrimination tool.

DETAILED DESCRIPTION OF PREFERRED EMBODIMENTS

Figure 1:
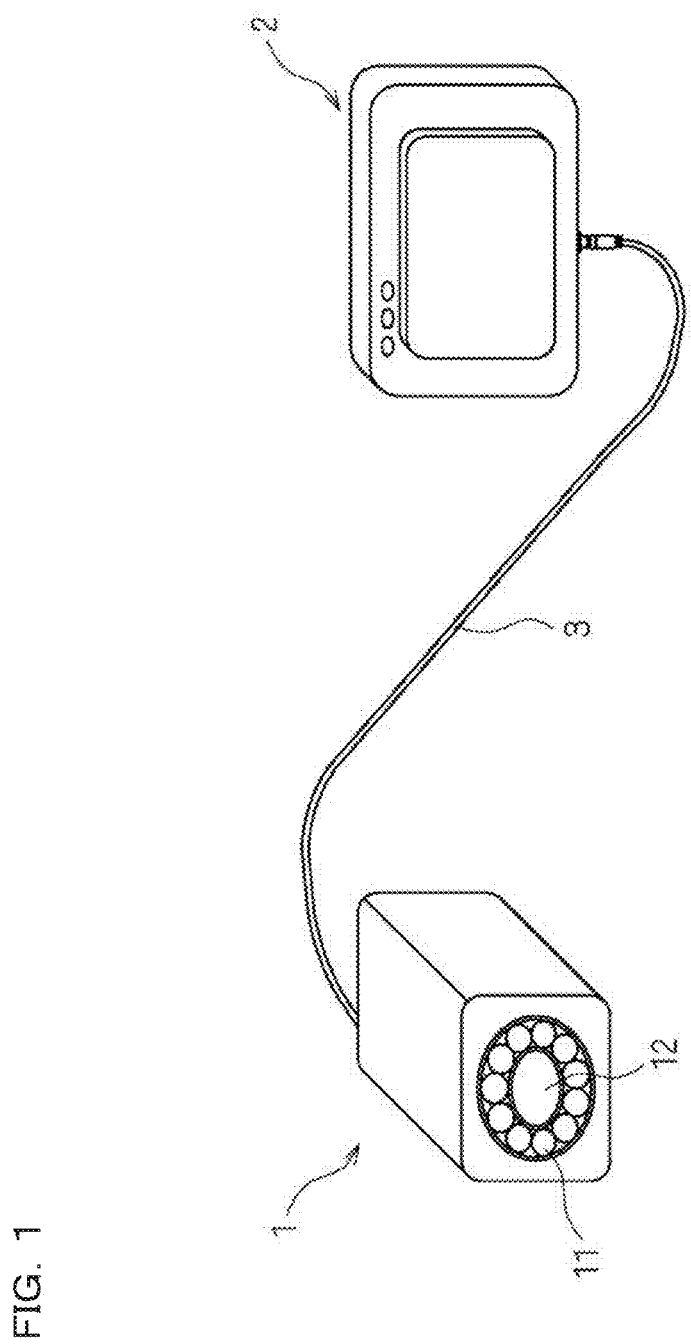
FIG. 1 is a schematic view showing a configuration of an image processing sensor according to an embodiment of the present invention.

Hereinafter, an image processing apparatus according to an embodiment of the present invention will be described with reference to the drawings. It is to be noted that elements having the same or similar configurations or functions throughout the drawings referenced in descriptions of the present embodiment are provided with the same or similar reference numerals, and detailed descriptions thereof are omitted. Hereinafter, descriptions will be given, taking as an example an image processing sensor as an image processing apparatus.

FIG. 1 is a schematic view showing a configuration of an image processing sensor according to an embodiment of the present invention. As shown in FIG. 1, the image processing sensor according to the present embodiment is configured by an imaging device 1 and a display device 2 connected with the imaging device 1 through a connection cable 3 in a data communicable manner.

Needless to say, the image processing sensor may be an external computer having a display in place of the display device 2. The imaging device 1 and the display device 2 may be integrally formed.

The imaging device 1 includes therein an FPGA, DSP, and the like which execute image processing, and includes a camera module (imaging portion) for imaging an inspection object to acquire image data, and an illumination part for irradiating the inspection object with light. In order to make the imaging device 1 compact, for example, as shown in FIG. 1, a lens 12 is arranged close to the center of the front face of the imaging device 1, and a plurality of LEDs 11 are arranged as the illumination part so as to surround the periphery of the lens 12. It is to be noted that external illumination (ring illumination, or the like) may be provided separately from the imaging device 1.

Figure 2A:
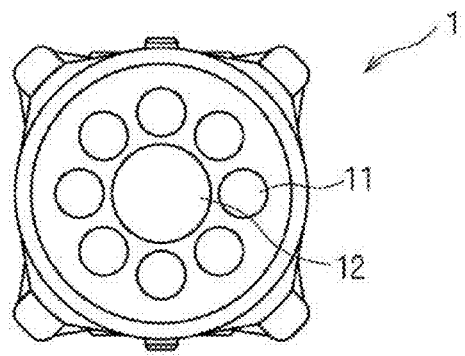
FIGS. 2A to 2C are outline views showing a configuration of an imaging device of the image processing sensor according to the embodiment of the present invention.
Figure 2B:
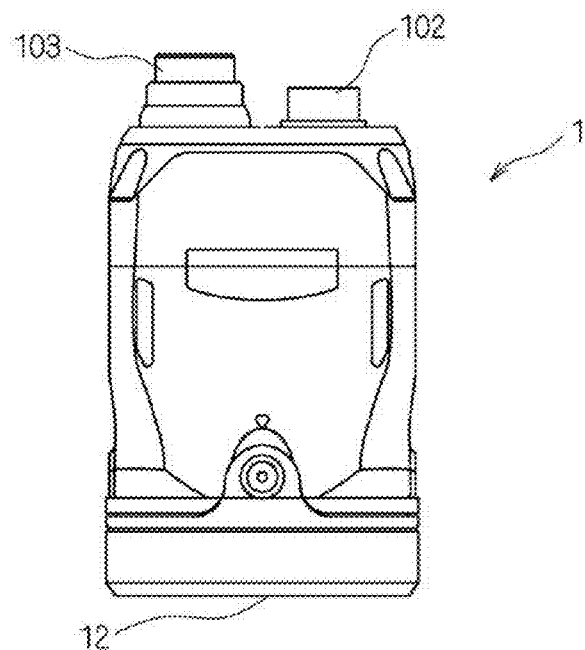
Figure 2C:
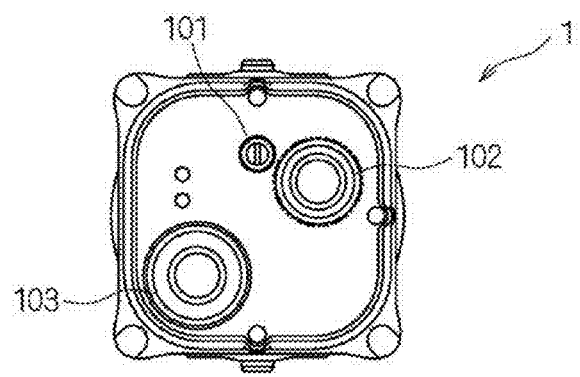

FIGS. 2A to 2C are outline views showing a configuration of the imaging device 1 of the image processing sensor according to the embodiment of the present invention. FIG. 2A is a front view showing the configuration of the imaging device 1 of the image processing sensor according to the embodiment of the present invention, FIG. 2B is a plan view showing the configuration of the imaging device 1 of the image processing sensor according to the embodiment of the present invention, and FIG. 2C is a rear view showing the configuration of the imaging device 1 of the image processing sensor according to the embodiment of the present invention.

As shown in FIG. 2A, the lens 12 is arranged close to the center of the front face of the imaging device 1, and the plurality of LEDs 11 are arranged so as to surround the periphery of the lens 12. At the time of imaging, the plurality of LEDs 11 are turned on to irradiate the inspection object with light, thereby allowing clear imaging of the inspection object.

As shown in FIGS. 2B and 2C, the imaging device 1 includes, on its rear face, a power source connector 102 to be connected with a power cable that receives supply of electric power from an external power source, and a connection connector 103 connectable with the connection cable 3 that performs data communication with the display device 2. Further, the imaging device 1 also includes, on the rear face, a focus adjusting screw 101 capable of manually adjusting a focus.

Figure 3:
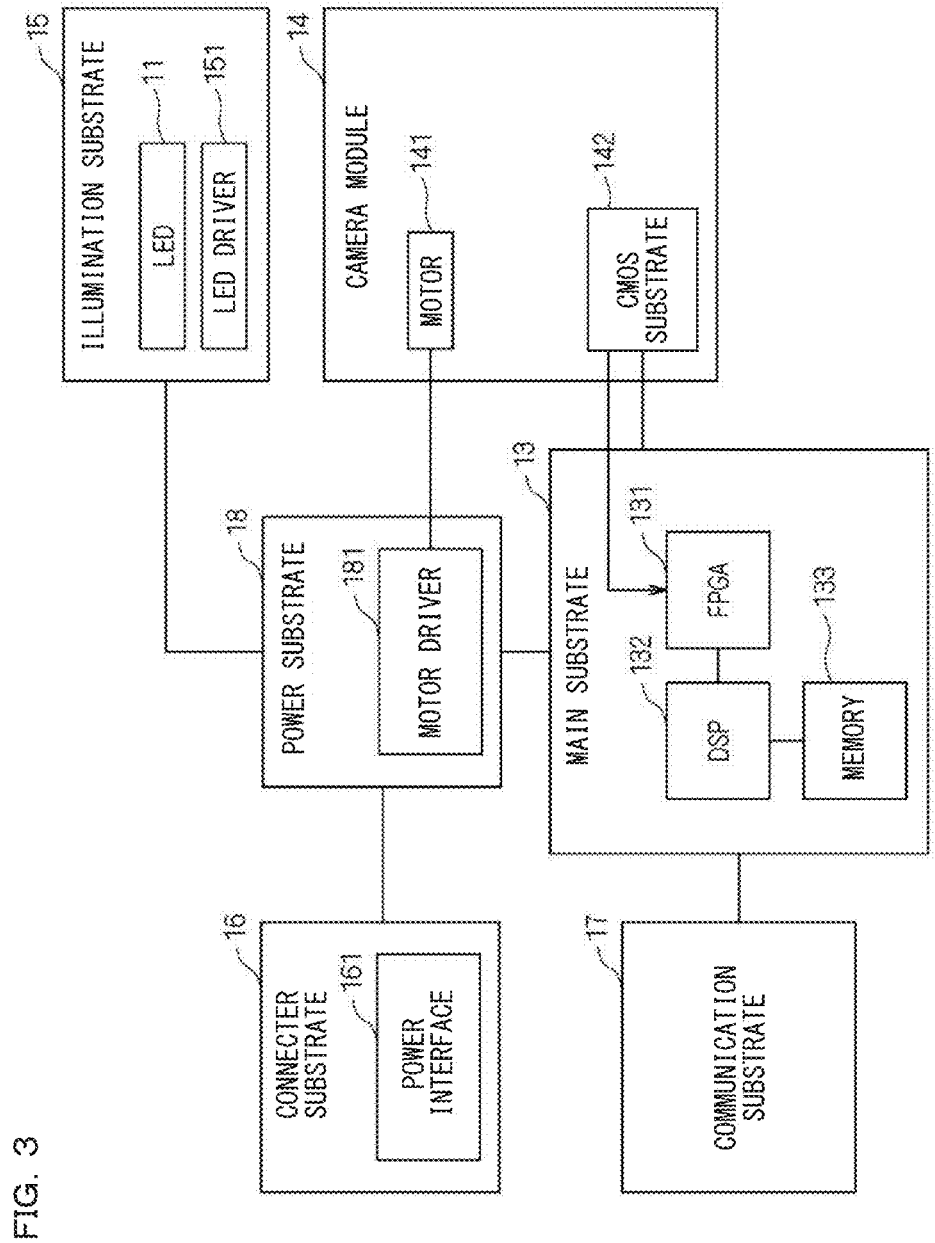
FIG. 3 is a block diagram showing a hardware configuration of the imaging device of the image processing sensor according to the embodiment of the present invention.

FIG. 3 is a block diagram showing a hardware configuration of the imaging device 1 of the image processing sensor according to the embodiment of the present invention. In FIG. 3, a connector substrate 16 receives supply of electric power from the external power source via the power source connector 102 (see FIGS. 2B and 2C) provided in a power interface 161. A power substrate 18 supplies the supplied electric power to each substrate. In the present embodiment, electric power is supplied to a camera module 14 via a main substrate 13.

A motor driver 181 of the power substrate 18 supplies drive electric power to a motor 141 of the camera module 14, to realize auto focusing.

A communication substrate 17 transmits an OK/NG signal (determination signal) indicating failure/non-failure of the inspection object in accordance with whether or not a defect has been detected, image data, and the like outputted from the main substrate 13 to the display device 2. The display device 2 having received the determination signal displays a result of the determination. In addition, although the OK/NG signal (determination signal) is outputted via the communication substrate 17 in the present embodiment, the OK/NG signal (determination signal) may be outputted via the connector substrate 16, for example.

An illumination substrate 15 is provided with the plurality of LEDs 11 for irradiating with light, an imaging region where an inspection object is imaged, and a reflector (not shown) is provided in front of the plurality of LEDs 11. Further, the lens 12 is interchangeable as a lens unit for a short distance or a long distance.

In the camera module (imaging portion) 14, a motor 141 is driven, to thereby allow control of the auto focusing operation. The inspection object is imaged in accordance with an imaging instruction signal from the main substrate 13. In the present embodiment, a CMOS substrate 142 is provided as an imaging element, and an imaged color image is converted to an HDR image based on a conversion characteristic of expanding a dynamic range on the CMOS substrate 142, and is outputted to an FPGA 131 of the main substrate 13.

The main substrate 13 controls an operation of each substrate having been connected therewith. For example, with respect to the illumination substrate 15, a control signal for controlling turning-on/off of the plurality of LEDs 11 is transmitted to an LED driver 151. The LED driver 151, for example, adjusts turning on/off, an amount of light, and the like, of the LEDs 11 in accordance with the control signal from the FPGA 131. Further, a control signal for controlling an auto focusing operation is transmitted to the motor 141 of the camera module 14 via a motor driver 181 of the power substrate 18, and an imaging instruction signal or the like is transmitted to the CMOS substrate 142.

While performing illumination control and imaging control, the FPGA 131 of the main substrate 13 executes compression processing (compression processing portion) on image data captured by performing imaging in the imaging portion and executes image processing (image processing portion) for inspection. Further, a DSP 132 of the main substrate 13 executes edge detection processing, pattern search processing, and the like on the image data. As a result of the pattern search processing, an OK/NG signal (determination signal), indicating failure/non-failure of the inspection object in accordance with whether or not a defect has been detected is outputted to the communication substrate 17. A result of the arithmetic processing and the like are stored into a memory 133. Further, as a reference image to become a reference for the image processing, the memory 133 stores compressed image data obtained by executing the compression processing at a predetermined compression rate or partial image data as image data obtained by extracting a set range. Although the FPGA 131 executes illumination control, imaging control, and the like in the present embodiment, the DSP 132 may execute the illumination control, the imaging control, and the like. Further, a circuit formed of the FPGA 131 united with the DSP 132, namely, a main control circuit (main control unit), may be provided. In short, the control signal for controlling turning-on/off of the plurality of LEDs 11 may be transmitted to the LED driver 151, the control signal for controlling an auto focusing operation may be transmitted to the motor 141 of the camera module 14, the imaging instruction signal or the like may be transmitted to the CMOS substrate 142, or the main control unit having both functions of the FPGA 131 and the DSP 132 may be provided.

Figure 4:
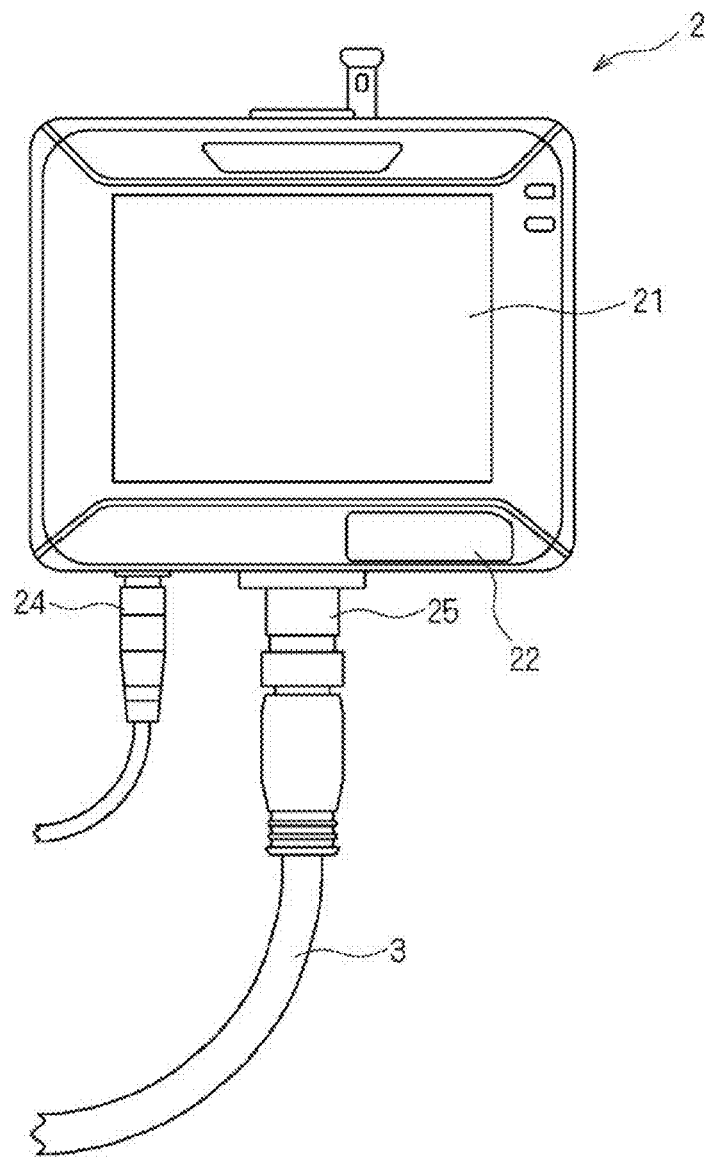
FIG. 4 is a front view showing a configuration of a display device of the image processing sensor according to the embodiment of the present invention.

FIG. 4 is a front view showing a configuration of the display device 2 of the image processing sensor according to the embodiment of the present invention. As shown in FIG. 4, a touch panel 21 is provided at the center portion of the front face of the display device 2, and displays a color image of an imaged inspection object on the screen, while accepting a selection input by the user.

Further, the display device 2 is provided with a power connector 24 to be connected with the power cable supplied with electric power from the external power source, and a power connector 25 connectable with the connection cable 3 that performs data communication with the imaging device 1. Further, a USB port 22 connectable with a USB memory and the like is provided on the front face.

Figure 5A:
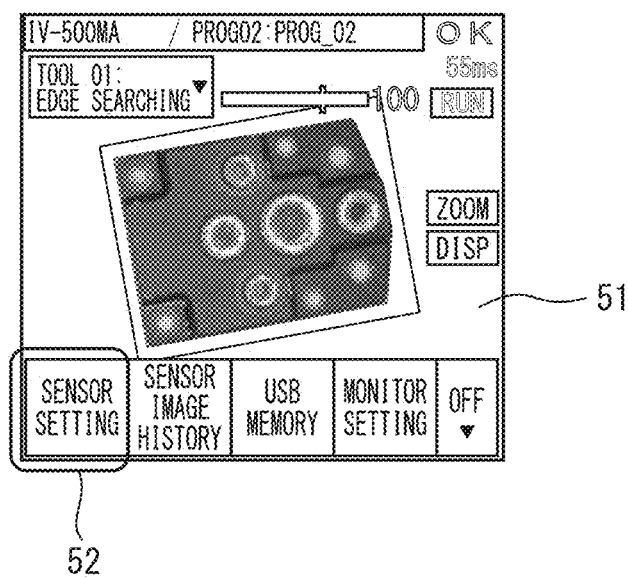
FIGS. 5A and 5B are exemplary views of mode switching screens in the display device of the image processing sensor according to the embodiment of the present invention.
Figure 5B:
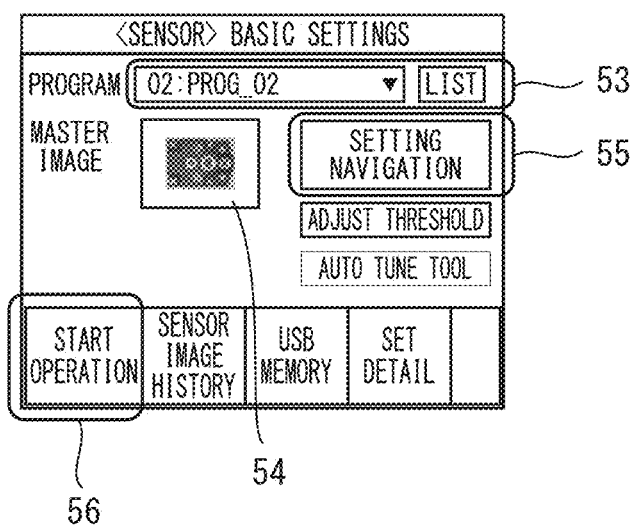

The user selects a button displayed on the screen of the touch panel 21 of the display device 2, to thereby control an operation of the image processing sensor. It is also possible to switch between "inspection mode" for executing an inspection of the inspection object and "setting mode" for performing a condition setting for the image processing sensor. In other words, the image processing sensor according to the present embodiment has a mode switching part for switching between the inspection mode (Run mode) for determining failure/non-failure of the inspection object and the setting mode (Non-Run mode) for setting a variety of parameters (imaging parameter, illumination parameter, image processing parameter, and the like) which are used for the inspection. FIGS. 5A and 5B are exemplary views of mode switching screens in the display device 2 of the image processing sensor according to the embodiment of the present invention.

FIG. 5A is an exemplary view of a screen display of "inspection mode". As shown in FIG. 5A, an image of the inspection object imaged by the imaging device 1 is displayed in an inspection object displaying region 51. A "SENSOR SETTING" button 52 at the lower left functions as the mode switching part, and when the "SENSOR SETTING" button 52 is selected, the mode is switched to "setting mode", and the screen transitions to the screen shown in FIG. 5B.

FIG. 5B is an exemplary view of a screen display of "setting mode". As shown in FIG. 5B, the kind of the inspection object or an inspection environment is selected in a program selecting region 53. Herein, the "program" means a series of data groups (combination of parameter values) set in accordance with the kind of the inspection object or the inspection environment, and a different data group can be stored as the program with respect to each kind of the inspection object or the inspection environment.

Further, when a master image to become a reference for comparison with the inspection object is stored, the master image is displayed in a master image displaying region 54. When a "SETTING NAVIGATION" button 55 is selected, the screen transitions to a setting screen for performing detailed setting. A "START OPERATION" button 56 of FIG. 5B functions as the mode switching part, and when the "START OPERATION" button 56 is selected, the mode is switched to "inspection mode", and the screen transitions to the screen shown in FIG. 5A.

Figure 6A:
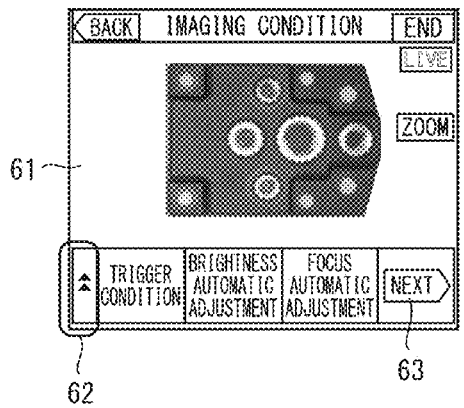
FIGS. 6A to 6F are exemplary views of setting screens in the display device of the image processing sensor according to the embodiment of the present invention.
Figure 6B:
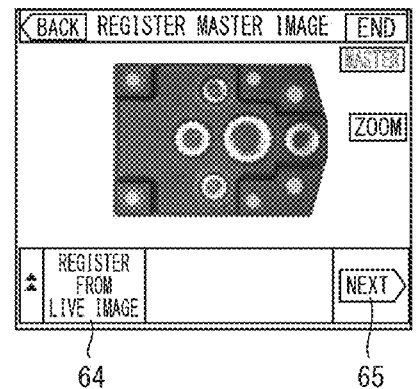
Figure 6C:
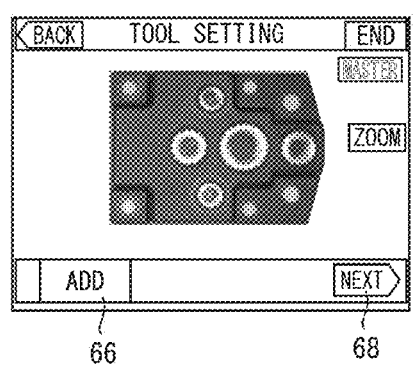
Figure 6D:
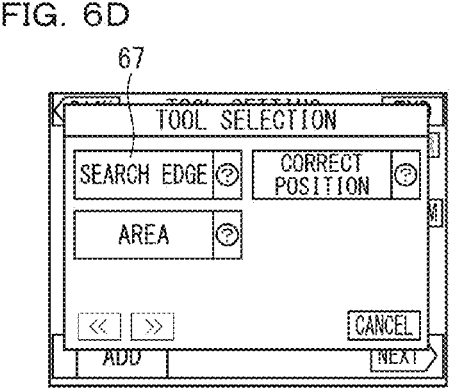
Figure 6E:
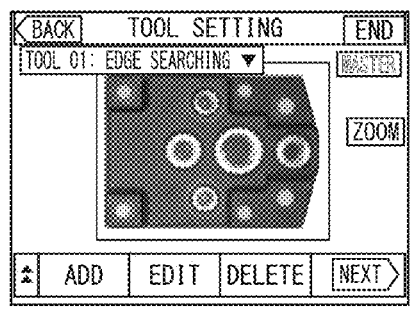
Figure 6F:
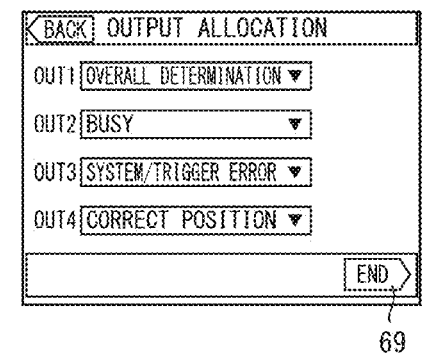

FIGS. 6A to 6F are exemplary views of setting screens in the display device 2 of the image processing sensor according to the embodiment of the present invention. Through the setting screens shown in FIGS. 6A to 6F, the user sequentially performs setting in the flow of setting of the imaging condition (FIG. 6A), registration of the master image to become a reference for pattern searching (FIG. 6B), setting of a tool such as edge searching on the master image (FIGS. 6C to 6E), and allocation of an output (FIG. 6F). Hereinafter, a detailed description will be given. When the "SETTING NAVIGATION" button 55 shown in FIG. 5B is selected, first, an imaging condition setting screen shown in FIG. 6A is displayed. On the imaging condition setting screen, the master image is displayed in a main display region 61 when the master image is stored, and a setting button group for setting imaging conditions is displayed in the lower part of the screen. For example, when a "TRIGGER CONDITION" button is selected, it is possible to set a trigger condition for specifying a timing when the imaging device 1 images the inspection object. Although a detailed setting screen is omitted, when each button is selected, the setting screen is displayed on the touch panel 21 shown in FIG. 4 in accordance with each setting condition.

If the master image is not stored, or even if the master image is stored, a currently imaged image (hereinafter, live image) may be displayed in the main display region 61. In this case as well, when a "REGISTER LIVE IMAGE" button 64 is selected as described later, the currently imaged image is registered as the master image.

Further, for more detailed setting, an "EXTENDED FUNCTION" button 62 of FIG. 6A may be selected. When the "EXTENDED FUNCTION" button 62 is selected, a button for performing detailed setting is separately displayed. As described above, on the imaging condition setting screen, it is possible to adjust brightness, adjust focus, and set imaging range, on/off of illumination, on/off of zooming, and the like.

When a "screen transition" button 63, displayed as "NEXT", of FIG. 6A is selected, a master image registering screen shown in FIG. 6B is displayed. Hereinafter, a variety of tools for inspection will be set on the registered master image. In the present embodiment, one program is stored with respect to one master image. That is, a different tool is set on a specific master image, and one program is previously stored with respect to the specific master image. In some cases, the same master image may be used between the different programs.

As the master image, the currently imaged image may be registered, or a previously imaged image may be selected and registered. In the case of registering the currently imaged image, the user may select the "REGISTER LIVE IMAGE" button 64. An image being imaged at the time of selection of the "REGISTER LIVE IMAGE" button 64 is registered as the master image.

When a "screen transition" button 65 displayed as "NEXT" of FIG. 6B is selected, a tool setting screen for each master image, shown in FIG. 6C, is displayed. Hereinafter, a variety of tools for inspection will be set on the master image.

On the tool setting screen, a tool for executing the inspection is additionally set in the displayed master image. When an "ADD" button 66 shown in FIG. 6C is selected, a tool selecting screen shown in FIG. 6D is displayed. A tool selected on the tool selecting screen is additionally set. For example, when a "SEARCH EDGE" button 67 is selected, an edge search setting screen shown in FIG. 6E is displayed. By previously setting which edge of the master image is to be checked with the imaged image of the inspection object on the edge search setting screen, it is possible to determine failure/non-failure of the inspection object in accordance with whether or not a defect has been detected. Hereinafter, a color area, positional correction, and the like can be set.

When a "screen transition" button 68 displayed as "NEXT" of FIG. 6C is selected, an output allocating screen, shown in FIG. 6F, is displayed. On the output allocating screen, it is possible to set what an output line means, the line being displayed on the screen as a result of the inspection. When an "END" button 69 is selected, the screen display returns to "setting mode" shown in FIG. 5B. In this manner, by sequentially selecting the "screen transition" buttons 63, 65, 68 displayed as "NEXT" on the touch panel 21 of the display device 2 shown in FIG. 6, the user can easily set in a short period of time a variety of parameters which are used for the inspection. Further, since even a user who is not used to the image processing sensor is guided to a next operation on the display device 2, a variety of parameters can be easily set.

The present invention relates to preprocessing before the FPGA 131 of the main substrate 13 executes image processing on the captured image data. For example, in the case of using an imaging element with a WVGA for the CMOS substrate 142 of the camera module 14 of the image processing sensor, the number of pixels of the imaged image data is 752 pixels×480 pixels. In the case of using this for the image processing, each end portion where an image distortion due to the lens 12 is relatively large is deleted, and image data with 640 pixels×480 pixels is used.

Figure 7:
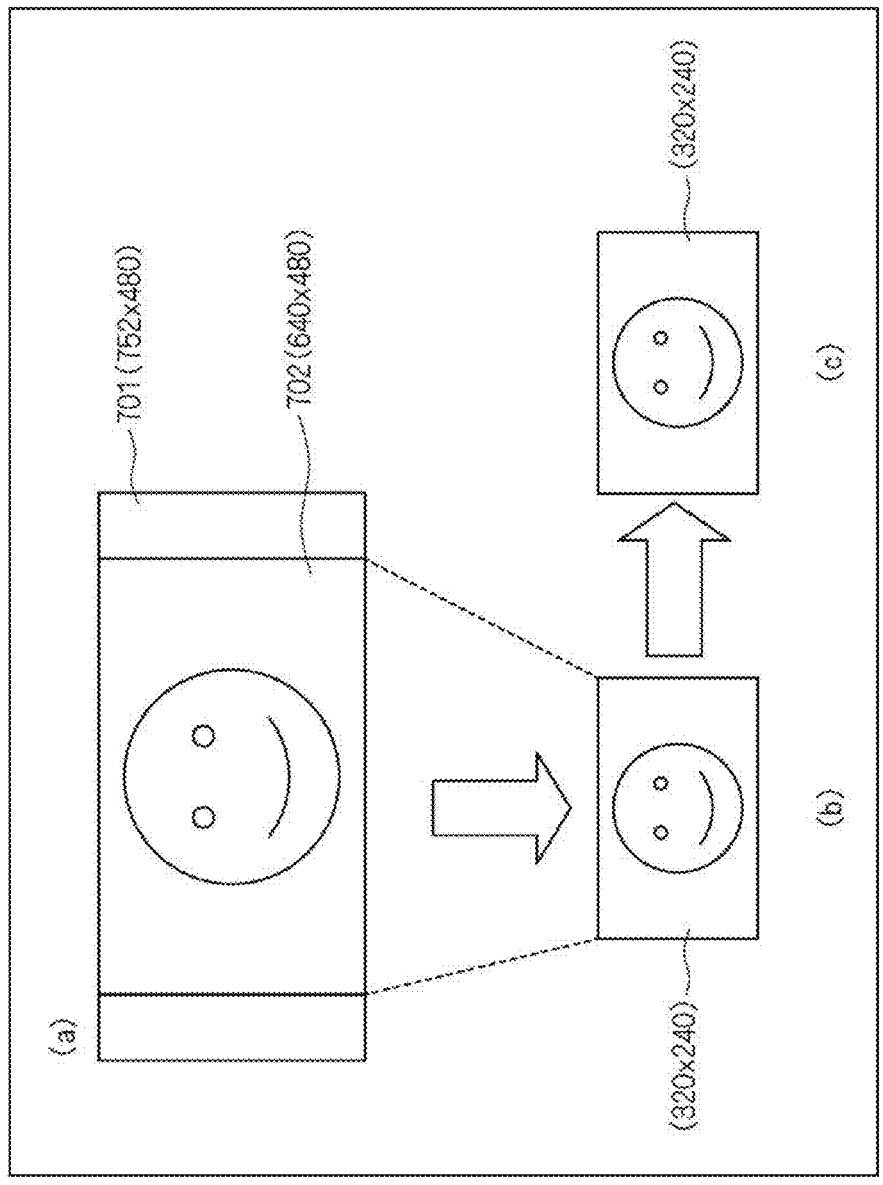
FIGS. 7A to 7C are schematic views showing an overview of compression processing of the image processing sensor according to the embodiment of the present invention.

FIGS. 7A to 7C are schematic views showing an overview of the compression processing of the image processing sensor according to the embodiment of the present invention. As shown in FIG. 7A, the number of pixels of the imaged image data is 752 pixels×480 pixels, and the image data with 640 pixels×480 pixels, each end portion of which has been deleted, is used for the image processing. When the number of pixels in a maximum display of the display device 2 is 320 pixels×240 pixels, the compression processing is executed on the image data with 640 pixels×480 pixels, and the compressed image data is generated so that the number of pixels agrees with the number of pixels in the maximum display of the display device 2

Although the method for the compression processing is not particularly limited, for example, compression may be performed by calculating an average value of pixel values of four peripheral pixels. Since the number of pixels in the maximum display of the display device 2 agrees with the number of pixels of the compressed image data shown in. FIG. 7B, the compressed image data is displayed and outputted as it is in the display device 2, as shown in FIG. 7C.

Figure 8A:
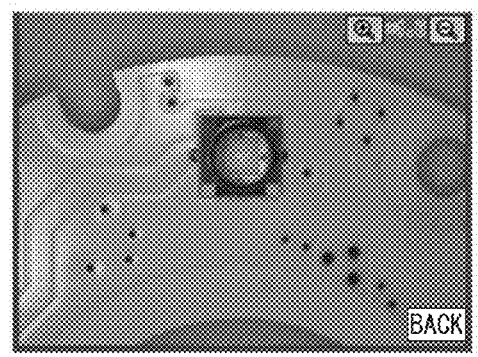
FIGS. 8A to 8C are exemplary views of images displayed after execution of the compression processing of the image processing sensor according to the embodiment of the present invention.
Figure 8B:
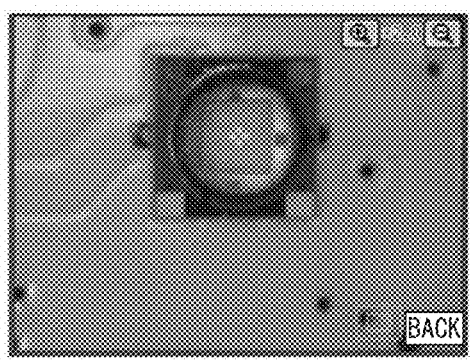
Figure 8C:
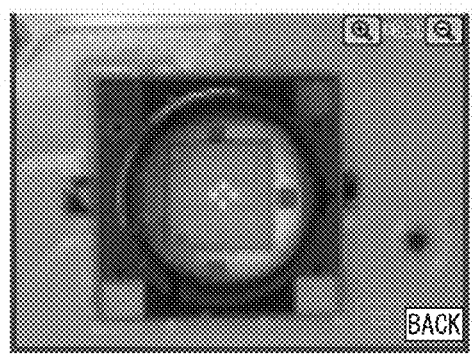

FIGS. 8A to 8C are exemplary views of images displayed after execution of the compression processing of the image processing sensor according to the embodiment of the present invention. An image of an inspection object shown in FIG. 8A is obtained by displaying and outputting compressed image data as it is. FIG. 8B shows an image which is displayed and outputted when the displayed and outputted compressed image data is zoomed twice.

In FIG. 8B, although the inspection object itself is enlarged and displayed, a display resolution becomes rough, resulting in a blurry display. Similarly, FIG. 8C shows an image obtained by zooming three times. In FIG. 8C, although the inspection object is more enlarged and displayed, a display resolution becomes rougher and the display becomes less clear.

Accordingly, the more the display is enlarged, the more difficult viewing of the characteristic portion of the inspection object becomes, and it becomes more difficult to keep the accuracy of the inspection high.

In the image processing sensor according to the present embodiment, by accepting a selection made by the user, it is possible to execute the image processing by use of the partial image data as part of image data in place of the compressed image data. It is the same as in the case of generating the compressed image data in that the number of pixels of the imaged image data is 752 pixels×480 pixels and the image data with 640 pixels×480 pixels, each end portion of which has been deleted, is used. However, it is different in that, when the number of pixels in the maximum display of the display device 2 is 320 pixels×240 pixels, the range of 320 pixels×240 pixels is extracted from the image data with 640 pixels×480 pixels, to generate partial image data.

Figure 9:
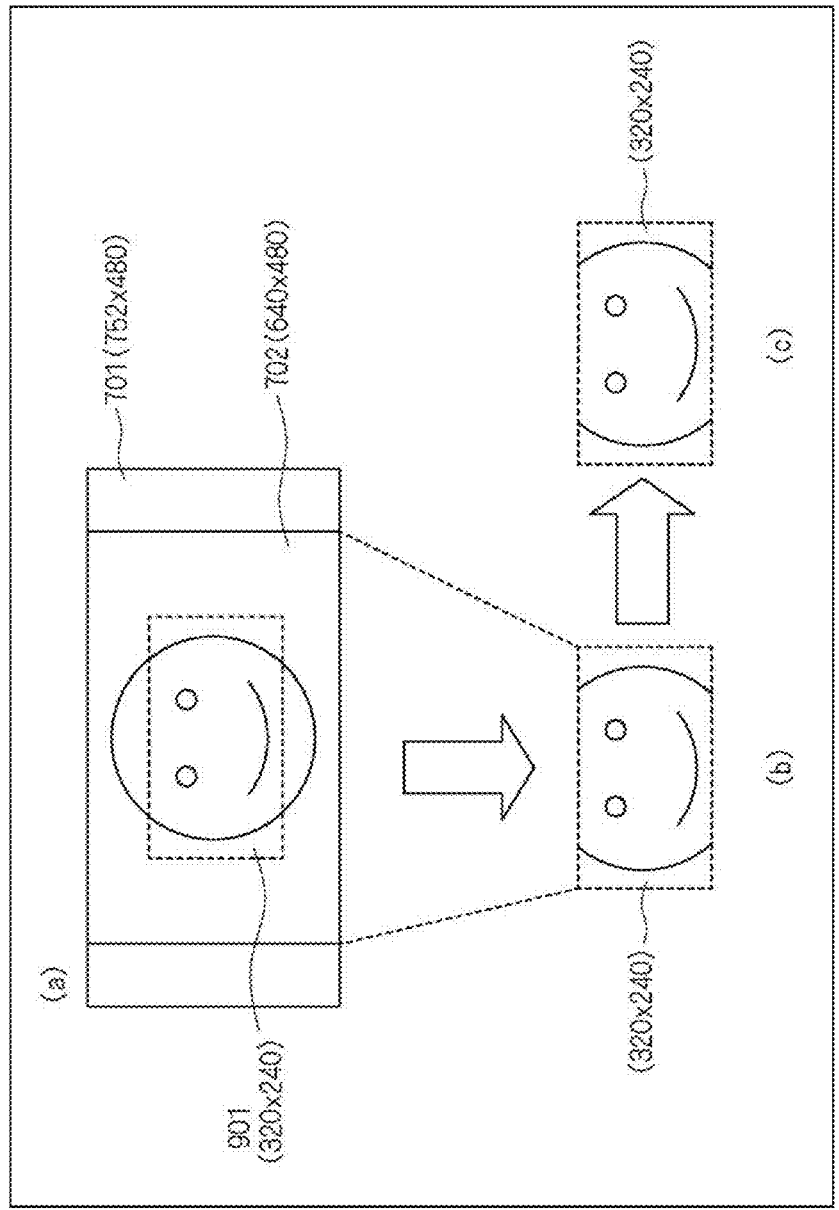
FIGS. 9A to 9C are schematic views showing an overview of generation processing for partial image data of the image processing sensor according to the embodiment of the present invention.

FIGS. 9A to 9C are schematic views showing an overview of generation processing for partial image data of the image processing sensor according to the embodiment of the present invention. As shown in FIG. 9A, the number of pixels of the imaged image data is 752 pixels×480 pixels, and the image data with 640 pixels×480 pixels, each end portion of which has been deleted, is used for the image processing. The range to be extracted as partial image data is set to an extracted range 901 in accordance with the number of pixels in the maximum display of the display device 2, to generate partial image data with 320 pixels×240 pixels.

Since the number of pixels of the partial image data agrees with the number of pixels in the maximum display of the display device 2, the partial image data is displayed as it is and outputted in the display device 2, as shown in FIG. 9C.

Figure 10A:
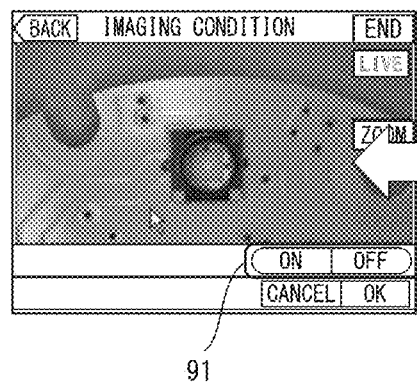
FIGS. 10A and 10B are exemplary views of screens displayed after execution of the generation processing for partial image data of the image processing sensor according to the embodiment of the present invention.
Figure 10B:
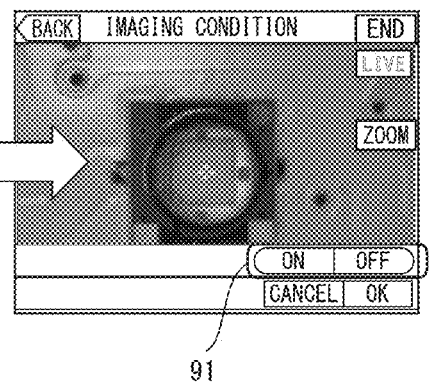

FIGS. 10A and 10B are exemplary views of screens displayed after execution of the generation processing for partial image data of the image processing sensor according to the embodiment of the present invention. An image of an inspection object shown in FIG. 10A is obtained by displaying and outputting image data captured by performing imaging. FIG. 10B is the exemplary view of the image that is displayed in the case of selecting "ON" on a zoom button 91 of FIG. 10A.

In FIG. 10B, the partial image data with 320 pixels×240 pixels, generated from the image data with 640 pixels×480 pixels, is displayed. That is, the zoom button 91 functions as an image selecting part for selecting an image to be displayed, and although it is apparently seen as having been zoomed twice, the display is actually switched to the partial image data.

In the image processing sensor according to the present embodiment, in the case of using the partial image data, not whole but part of the image data is used, and hence it is possible to alleviate an arithmetic processing load for an image display, and also make a clear display without causing the display resolution of the image to be displayed to be rough. Accordingly, even when the display is enlarged, it is possible to view the characteristic portion of the inspection object, so as to keep the accuracy of the inspection high.

Figure 11:
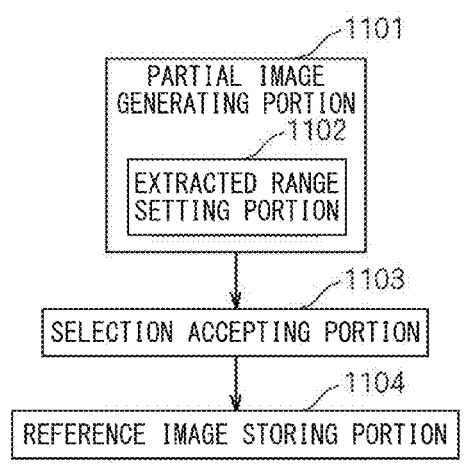
FIG. 11 is a function block diagram of the imaging device of the image processing sensor according to the embodiment of the present invention.

FIG. 11 is a function block diagram of the imaging device 1 of the image processing sensor according to the embodiment of the present invention. A partial image generating portion 1101 generates partial image data as part of image data captured by performing imaging. The partial image data including the center of the image data captured by performing imaging is preferably generated as the partial image data. This is because imaging is normally performed so that the inspection object is located at the center of the screen.

Figure 12:
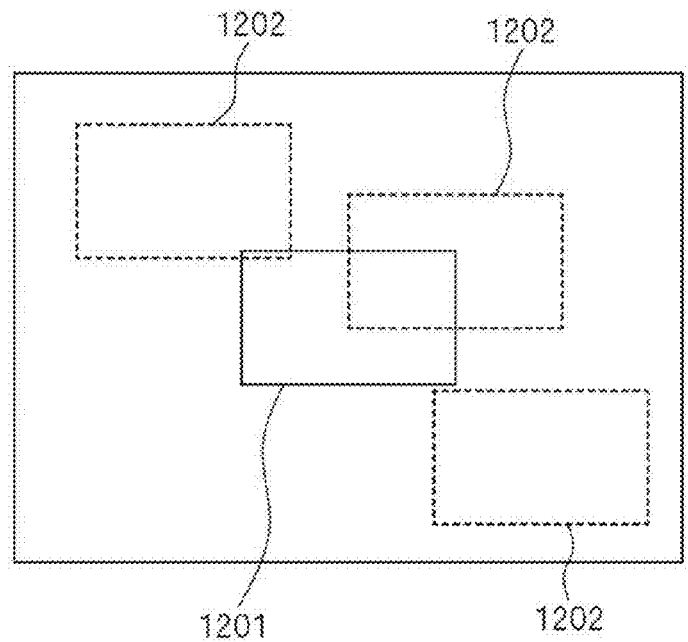
FIG. 12 is an exemplary view of extracted range setting for the image processing sensor according to the embodiment of the present invention.

However, the characteristic portion of the inspection object is not necessarily present at the center. Thereat, an extracted range setting portion 1102 is provided so that a range extracted as the partial image data can be freely set. FIG. 12 is an exemplary view of extracted range setting for the image processing sensor according to the embodiment of the present invention.

As shown in FIG. 12, the partial image data is typically generated by extracting an extracted range 1201 including the center of the image data captured by performing imaging. However, depending on the inspection object, the characteristic portion of the inspection object may not be present at the center of the characteristic portion of the inspection object, but may be present in the peripheral portion thereof. Thereat, the range to be extracted as the partial image data is moved by a drag operation or the like so as to be an extracted range 1202. Accordingly, the partial image data can be generated so that the characteristic portion of the inspection object is present close to the center of the image data.

It is to be noted that the partial image data is preferably generated so that an aspect ratio of the partial image data is equal to an aspect ratio of the screen of the display device 2. This is because, when an enlargement rate/reduction rate are automatically adjusted by the display device 2 at the time of display, the displayed image may be enlarged/reduced at a different aspect ratio from that of original image data and displayed. However, the aspect ratios are not necessarily completely the same, and the inspection can be performed without any trouble as long as they are in such a range that the user can view the characteristic portion of the inspection object.

Further, the partial image data is generated so that the number of pixels of the partial image data is equal to the number of pixels of the screen of the display device 2. This is because the data becomes as clear as the original image data at the time of display, to allow viewing of the characteristic portion of the inspection object. However, the number of pixels is not necessarily completely the same, and the inspection can be performed without any trouble as long as they are in such a range that the user can view the characteristic portion.

Returning to FIG. 11, a selection accepting portion 1103 accepts a selection of any of the compressed image data and the partial image data as image data to be stored as the reference image to become a reference for the image processing. That is, in accordance with the selection accepted in the selection accepting portion 1103, either processing of generating the compressed image data or processing of generating the partial image data is executed.

A reference image storing portion 1104 stores the compressed image data or the partial image data, the selection of which has been accepted, into the memory 133 as the reference image. That is, normally, the compressed image data is read out from the memory 133 and displayed in the display device 2, and when "ON" is selected in the zoom button 91 of FIG. 10A, the partial image data is read out from the memory 133 and displayed in the display device 2. In such a manner, although the image has apparently been seen as having been enlarged, the display is actually switched to the partial image data corresponding to the number of pixels of the screen of the display device 2, thereby allowing display of a clear image.

Figure 13:
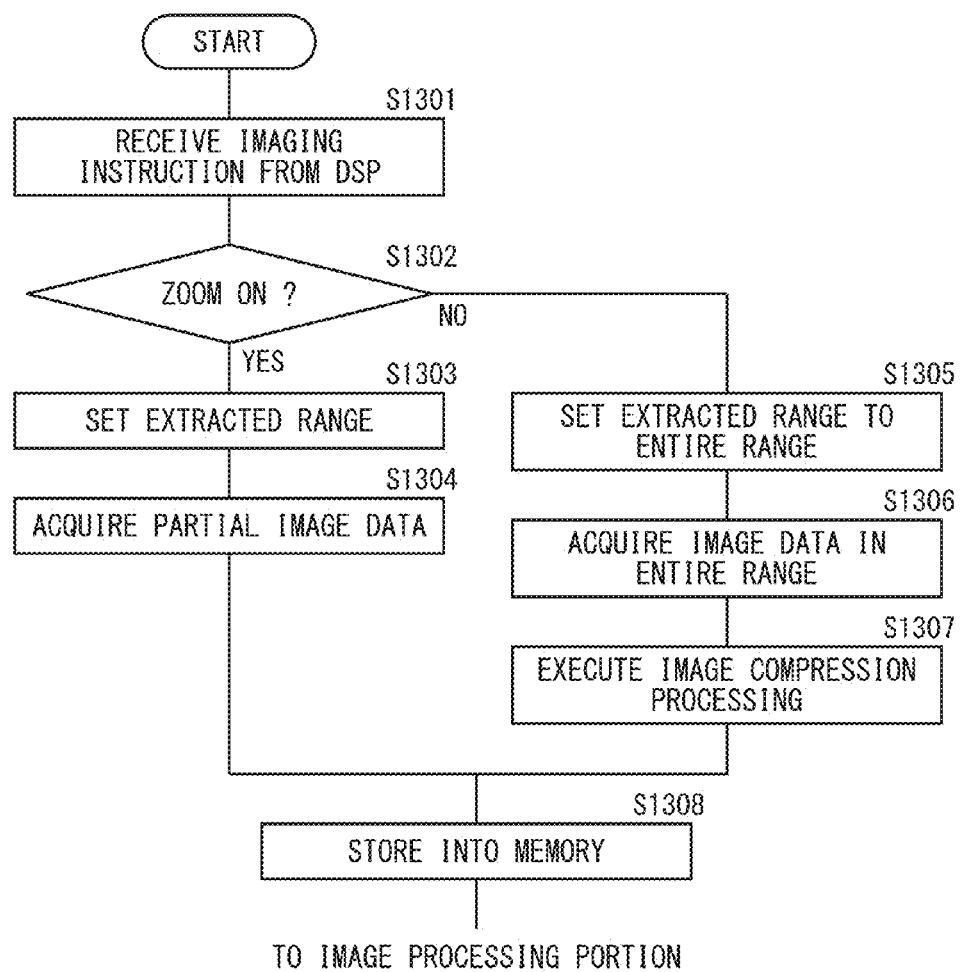
FIG. 13 is a flowchart showing a procedure for an FPGA of a main substrate in the imaging device of the image processing sensor according to the embodiment of the present invention.

FIG. 13 is a flowchart showing a procedure for the FPGA 131 of the main substrate 13 in the imaging device 1 of the image processing sensor according to the embodiment of the present invention. In FIG. 13, the FPGA 131 of the main substrate 13 of the imaging device 1 receives an imaging instruction in the camera module 14 from the DSP 132 (step S1301).

The FPGA 131 determines whether or not a zoom is in an "ON" state (step S1302). When the FPGA 131 determines that the zoom is in the "ON" state (step S1302: YES), the FPGA 131 sets the range to be extracted as the partial image data (step S1303), and transmits an instruction signal to the CMOS substrate 142.

Setting of the range to be extracted as the partial image data is not particularly restricted as long as part of the imaged image data is included. The CMOS substrate 142 having received the instruction signal transmits image data in the set range as the partial image data to the FPGA 131.

The FPGA 131 acquires the partial image data from the CMOS substrate 142 (step S1304), and stores the partial image data into the memory 133 (step S1308). Subsequently, the partial image data is passed to the image processing portion, to execute the image processing for executing the inspection.

When the FPGA 131 determines that the zoom is in an "OFF" state (step S1302: NO), the FPGA 131 sets the range to extract the image data to the entire range (step S1305), and transmits the instruction signal to the CMOS substrate 142.

The CMOS substrate 142 having received the instruction signal transmits the image data in the entire range to the FPGA 131.

The FPGA 131 acquires the image data in the entire range from the CMOS substrate 142 (step S1306), and executes the compression processing on the captured image data (step S1307).

For example, when the image data is captured as image data with 640 pixels×480 pixels, the image is compressed to 320 pixels×240 pixels as the number of pixels in the maximum display of the display device 2, to generate the compressed image data.

The FPGA 131 stores the compressed image data into the memory 133 (step S1308), and thereafter, passes the compressed image data to the image processing portion, to execute the image processing for the inspection.

The processes of steps S1301 to S1308 described above are also executed on the foregoing "setting mode" and "inspection mode". FIG. 14 is a table showing a list of inspection condition data for a positional correction tool and an edge discrimination tool. Specifically, first, on "setting mode", the user sets inspection condition data concerning conditions for inspecting the inspection object, for example including the parameters as shown in FIG. 14, via the display device 2. Herein, when the zoom is in the "ON" state (step S1302: YES), partial image data is captured (step S1304), an inspection tool is set on the partial image data, and the data is registered as the reference image (step S1308). On the other hand, when the zoom is in the "OFF" state (step S1302: NO), the image compression processing is executed (step S1307), the inspection tool is set on compressed image data, and the data is registered as the reference image (step S1308).

Next, on "inspection mode", the selection of the image data for use in the image processing is accepted based on the parameter included in the inspection condition data set on "setting mode" and showing which of the compressed image data and the partial image data is to be used (step S1302). That is, in the case of using the compressed image data as the image data for use in the image processing on "inspection mode" (step S1302: NO), the image compression processing is executed on the image data of the inspection object sequentially captured in step S1306 (step S1307), and a comparison (e.g. processing of pattern searching, or the like) with the reference image registered in step S1308 of "setting mode" is performed. On the other hand, in the case of using the partial image data as the image data for use in the image processing on "inspection mode" (step S1302: YES), a comparison (e.g. processing of pattern searching, or the like) with the reference image registered in step S1308 of "setting mode" is performed on the partial image data sequentially captured in step S1304.

In this manner, the process flow shown in FIG. 13 is executed both on "setting mode" and "inspection mode". It is to be noted that, although the comparison (e.g. processing of pattern searching, or the like) with the reference image registered in step S1308 of "setting mode" is performed in the present embodiment, the comparison with the reference image is not particularly restricted. For example, in the case of performing inspection as to whether or not the color area is within a predetermined range having previously been set, the comparison with the reference image is not necessarily performed, and a threshold (upper limit and lower limit) defining the predetermined range may be set. In short, the selection of the image data for use in the image processing (compressed image data or partial image data) may be accepted based on the parameter included in the inspection condition data, and image processing such as color area inspection may be executed by use of the compressed image data or the partial image data, the selection of which has been accepted.

Further, the present invention is also applicable to so-called bank switching (program switching, variety switching). Specifically, for example when the kind of the inspection object conveyed along a belt conveyer is changed, naturally, the inspection condition data also needs to be changed. Thereat, a plurality of kinds of inspection condition data may be previously stored in accordance with the kind of the inspection object, and the inspection condition data may be switched when a variety switching signal is inputted from the PLC or the like. That is, the parameter showing which of the compressed image data and the partial image data is to be used, may be previously included in the inspection condition data, thereby allowing switching of the compressed image data or the partial image data, as well as switching of the inspection condition data.

A description is given taking as an example the "ZOOM SETTING" in the parameter list shown in FIG. 14. As a set value of the "ZOOM SETTING", either "NORMAL" or "2-FOLD ZOOM" can be selected.

When the inspection condition data is switched to one where "NORMAL" has been selected, the image processing is executed by use of the compressed image data, and when the inspection condition data is switched to one where "2-FOLD ZOOM" has been selected, the image processing is executed by use of the partial image data.

In short, the image processing sensor is provided with the inspection condition switching instruction accepting portion for accepting a switching instruction for the inspection condition data, and when the inspection condition switching instruction accepting portion accepts the switching instruction for the inspection condition data, the selection of the image data for use in the image processing is accepted based on the parameter included in the inspection condition data after switching. Although the variety switching signal from the PLC or the like is assumed herein as the switching instruction for the inspection condition data, the inspection condition data may be manually switched, for example, so that desired inspection condition data (program) is selected in the program selecting region 53 of FIG. 5B.

It should be noted that among the variety of setting items (setting parameters) shown in FIG. 14, as for trigger-related items, a parameter "TRIGGER SYSTEM" for selecting at least any of an internal trigger and an external trigger is preferably set as an essential setting item. As for imaging related items, a parameter "ZOOM SETTING" for selecting at least any of "NORMAL" and "2-FOLD ZOOM" (which of the compressed image data and the partial image data is to be used) is preferably set as the essential setting item. As for tool related items, a parameter "TOOL TYPE" for deciding at least what type of tool is to be used for performing the image processing and a parameter "THRESHOLD" (degree of agreement) to become a reference for the inspection accuracy are preferably set as the essential setting items. Especially, in the case of performing failure/non-failure determination for the inspection object, "TOOL TYPE" is preferably set as the essential setting item.

As described above, according to the present embodiment, the compressed image data or the partial image data, the selection of which has been accepted, is generated and stored as a reference image to become a reference for the image processing for the inspection, which image data is to be used is appropriately selected in accordance with contents of the inspection. Accordingly, the need for generating unnecessary image data is eliminated. Further, even in the case of executing the image processing by use of the partial image data, the accuracy of inspection is not reduced, thus allowing apparent exertion of an effect similar to an effect obtained by increasing a visual field magnification.

In addition, the present invention is not restricted to the above embodiment, and a variety of changes, modifications, and the like can be made as long as it is within the scope of the gist of the present invention. For example, the imaging device 1 and the display device 2 are not limited to the form of being directly connected through the connection cable 3, and needless to say, the imaging device 1 and the display device 2 may be connected via a network such as LAN, WAN, or the like. Further, although the imaging device 1 and the display device 2 are separated bodies in this embodiment, an image processing sensor obtained by unifying those devices may also be used.

Moreover, the display device 2 functions as a display part of the image processing apparatus. More specifically, the image processing apparatus is provided with the display part for displaying the compressed image data, and the display part also displays the generated partial image data. In the case of "inspection mode", the image processing for the inspection is executed while the compressed image data or the partial image data, the selection of which has been accepted in the selection accepting portion 1103, is displayed in the display part. Further, in the case of "setting mode", the reference image is stored while the compressed image data or the partial image data, the selection of which has been accepted in the selection accepting portion 1103, is displayed in the display part. As described above, both on "inspection mode" and "setting mode", a variety of processing can be executed while the compressed image data or the partial image data, the selection of which has been accepted in the selection accepting portion 1103, is displayed in the display part.

What is claimed is:

1. An image processing apparatus comprising:
   an imaging device including a camera module configured to acquire an image of an inspection object; and
   a display device in communication with the imaging device, adapted to display an image acquired by the camera module, and adapted to accept a user input, wherein the imaging device further includes:
   a compression processing portion configured to compress an image acquired by the camera module to generate a compressed image;
   a partial image generating portion configured to extract a part of an image acquired by the camera module to generate a partial image;
   an inspection condition data setting portion configured to set, based on the user input, a magnification of a reference image to be displayed on the display device, configured to control the display device to display the reference image at the magnification, and configured to set a parameter, an image processing tool and a trigger condition, wherein
   the parameter which represents the magnification of the reference image corresponding to an image to be processed is set, wherein the image processing tool which represents a type of image processing is set, based on the user input, on the reference image displayed at the magnification on the display device, and wherein the trigger condition specifies a timing for the camera module to acquire an inspection image of an inspection object;
   a memory for storing the parameter, the image processing tool, and the trigger condition set by the inspection condition data setting portion; and
   an image processing portion configured to control at least one of the compression processing portion and the partial image generating portion to process an image generated by the at least one of the compression processing portion and the partial image generating portion, wherein
   the image processing portion processes the compressed image generated from the inspection image acquired at the stored trigger condition with the stored image processing tool when the stored parameter is set as a first magnification of the reference image, and the image processing portion processes the partial image generated from the inspection image acquired at the stored trigger condition with the stored image processing tool when the stored parameter is set as a second magnification of the reference image higher than the first magnification.

2. The image processing apparatus according to claim 1, comprising
   a selection accepting portion for accepting a selection of any of the compressed image and the partial image, wherein
   the selection accepting portion accepts the selection of the image for use in the image processing based on the stored parameter.

3. The image processing apparatus according to claim 2, comprising
   an inspection condition switching instruction accepting portion for accepting a switching instruction for an inspection condition data including the parameter, the image processing tool, and the trigger condition, wherein
   when the inspection condition switching instruction accepting portion accepts the switching instruction for the inspection condition data, the selection accepting portion accepts the selection of the image for use in the image processing based on the parameter included in the inspection condition data after switching.

4. The image processing apparatus according to claim 2, comprising
   a reference image storing portion for storing, as the reference image, the compressed image or the partial image, the selection of which has been accepted in the selection accepting portion, wherein
   the image processing portion makes a comparison with the stored reference image, to execute the image processing for the inspection.

5. The image processing apparatus according to claim 1, wherein the partial image generating portion generates the partial image including a center of the image acquired by the camera module.

6. The image processing apparatus according to claim 1, wherein the partial image generating portion includes an extracted range setting portion for setting a range to be extracted as the partial image from the image acquired by the camera module, wherein
   the inspection condition data setting portion controls the display device to display the reference image corresponding to the range set by the extracted range setting portion when setting the parameter corresponding to the second magnification,
   the image processing portion controls the partial image generating portion so as to generate the partial image corresponding to the range set by the extracted range setting portion when the parameter is set corresponding to the second magnification by the inspection condition data setting portion.

7. The image processing apparatus according to claim 1, wherein the partial image generating portion generates the partial image so that an aspect ratio of the partial image is equal to an aspect ratio of a screen on which an image is displayed.

8. The image processing apparatus according to claim 1, wherein the partial image generating portion generates the partial image so that the number of pixels of the partial image is equal to the number of pixels of the screen on which the image is displayed.

9. The image processing apparatus according to claim 1, wherein
   the inspection condition data setting portion sets at least an internal trigger or an external trigger or both, as the trigger condition.

10. The image processing apparatus according to claim 1, wherein
    the inspection condition data setting portion sets an edge search tool for comparing an edge between the reference image and the inspection image as the image processing tool.

11. The image processing apparatus according to claim 1, further comprising
a mode switching portion configured to switch a setting mode for setting an inspection condition data by use of the reference image and an inspection mode for determining failure or non-failure of the inspection object by use of the inspection image, wherein
the inspection condition data setting portion sets the inspection condition data including the parameter, the image processing tool and the trigger condition in the setting mode, and
the image processing portion controls the compression processing portion or the partial image generating portion in the inspection mode, based on the parameter, the image processing tool and the trigger condition included in the inspection condition data set in the setting mode.

12. The image processing apparatus according to claim 1, wherein
the imaging device includes therein the compression processing portion, the partial image generating portion, the inspection condition data setting portion, the image processing portion and a output portion being configured to output a determination signal indicating failure or non-failure of the inspection object based on a result of image processing executed by the image processing portion.

13. An image processing method executable by an image processing apparatus comprising an imaging device including a camera module configured to acquire an image of an inspection object and a display device in communication with the imaging device, adapted to display an image acquired by the camera module, and adapted to accept a user input,
the imaging device further including a compression processing portion configured to compress an image acquired by the camera module to generate a compressed image and a partial image generating portion configured to extract a part of an image acquired by the camera module to generate a partial image, the image processing method comprising the steps of:
setting, based on the user input, a magnification of a reference image to be displayed on the display device;
controlling he display device to display the reference image at the magnification;
setting a parameter, an image processing tool and a trigger condition, wherein the parameter which represents the magnification of the reference image corresponding to an image to be processed is set, wherein the image processing tool which represents a type of image processing is set, based on the user input, on the reference image displayed at the magnification on the display device, and wherein the trigger condition specifies a timing for the camera module to acquire an inspection image of an inspection object;
storing the parameter, the image processing tool, and the trigger condition; and
processing the compressed image generated from the inspection image acquired at the stored trigger condition with the stored image processing tool when the stored parameter is set as a first magnification of the reference image, and processing the partial image generated from the inspection image acquired at the stored trigger condition with the stored image processing tool when the stored parameter is set as a second magnification of the reference image higher than the first magnification.

14. The image processing method according to claim 13, wherein
an inspection condition data concerning a condition for inspecting the inspection object is set, the inspection condition data including the parameter, the image processing tool and the trigger condition, and the selection of the image for use in the image processing is accepted based on the parameter included in the inspection condition data.

15. The image processing method according to claim 14, wherein
a switching instruction for the inspection condition data is accepted, and
when the switching instruction for the inspection condition data is accepted, the selection of the image for use in the image processing is accepted based on the parameter included in the inspection condition data after switching.

16. The image processing method according to claim 13, wherein
the compressed image or the partial image, the selection of which has been accepted, is stored as the reference image, and
a comparison is made with the stored reference image, to execute the image processing for the inspection.

17. The image processing method according to claim 13, wherein the partial image including a center of the image acquired by the camera module is generated.

18. The image processing method according to claim 13, wherein the partial image is generated so that an aspect ratio of the partial image is equal to an aspect ratio of a screen on which an image is displayed.

19. The image processing method according to claim 13, wherein the partial image is generated so that the number of pixels of the partial image is equal to the number of pixels of the screen on which the image is displayed.

* * * * *